United States Patent
Spradley et al.

(10) Patent No.: US 7,014,159 B1
(45) Date of Patent: Mar. 21, 2006

(54) X-RAY CASSETTE HOLDER AND CLIPS

(76) Inventors: Wade Spradley, 19319 S. Sheridan Rd., Mounds, OK (US) 74047; Paul Spradley, SE. Highway 10, Hackett, AR (US) 72937

( * ) Notice: Subject to any disclaimer, the term of this patent is extended or adjusted under 35 U.S.C. 154(b) by 68 days.

(21) Appl. No.: 10/266,446

(22) Filed: Oct. 8, 2002

(51) Int. Cl.
*A47G 1/10* (2006.01)

(52) U.S. Cl. .............................. 248/316.4; 248/316.2; 248/231.31; 269/236; 269/152; 269/91; 269/3

(58) Field of Classification Search ............ 248/316.4, 248/316.2, 295.11, 316.8, 231.41, 229.11, 248/229.21, 229.22, 231.21, 187.1, 231.31; 269/148, 212, 265, 276, 286, 236, 152, 91, 269/3, 6, 43, 95, 166; 403/80, DIG. 8
See application file for complete search history.

(56) References Cited

U.S. PATENT DOCUMENTS

| | | | |
|---|---|---|---|
| 2,473,643 A * | 6/1949 | Froblom | 269/148 |
| 2,567,996 A * | 9/1951 | Gaffney | 269/152 |
| 2,598,529 A | 5/1952 | Fritz | |
| 2,919,873 A | 1/1960 | Tice | |
| 3,801,789 A | 4/1974 | James | |
| 3,904,158 A * | 9/1975 | Michael | 248/668 |
| 4,414,683 A | 11/1983 | Robinson | |
| 4,455,671 A | 6/1984 | Farrar | |
| 4,457,010 A | 6/1984 | Jenkins et al. | |
| 4,542,522 A | 9/1985 | Blais | |
| 5,574,767 A | 11/1996 | Hayes | |
| 5,979,887 A * | 11/1999 | Hassman | 269/40 |
| 6,095,683 A | 8/2000 | Heimbrock et al. | |
| 2002/0039402 A1 | 4/2002 | Hecker | |

OTHER PUBLICATIONS

Diagnostic Imaging Systems Catalog, pp. 34, 37 and 51.

* cited by examiner

*Primary Examiner*—Gwendolyn Baxter
(74) *Attorney, Agent, or Firm*—Gable & Gotwals

(57) ABSTRACT

An x-ray cassette holder and clips capable of holding various types of x-ray cassettes including aluminum cassettes and tunnel cassettes. The clips when used with the tunnel cassettes allow for the changing of the vinyl cassette without releasing the cassette holder. The shaft or upright structure is calibrated to allow for easy positioning of the height of the cassette.

5 Claims, 4 Drawing Sheets

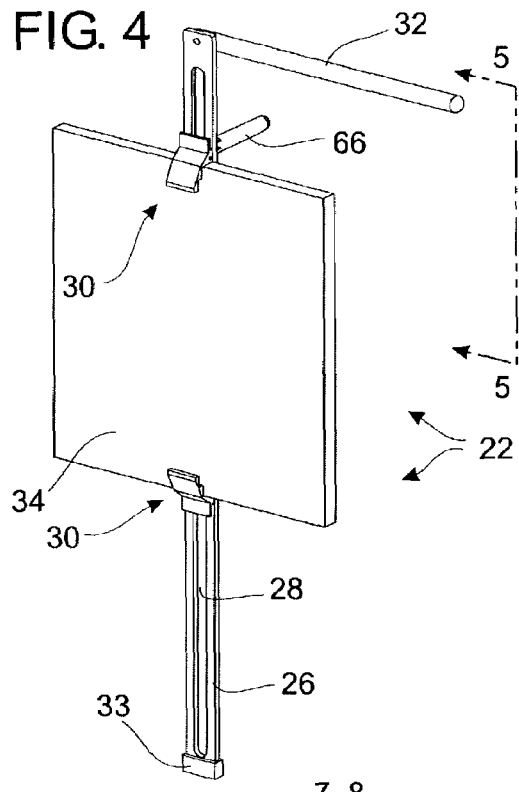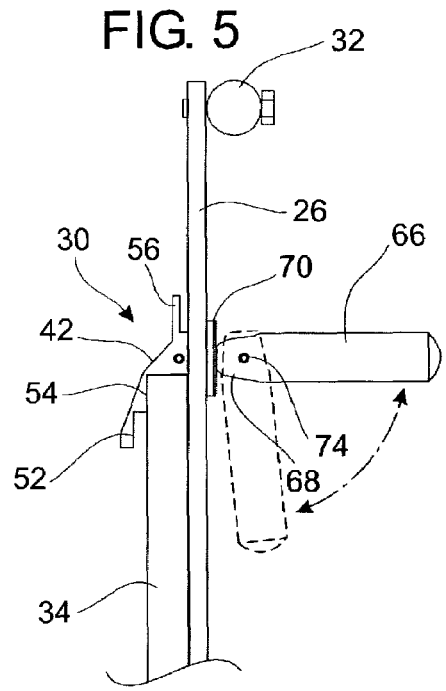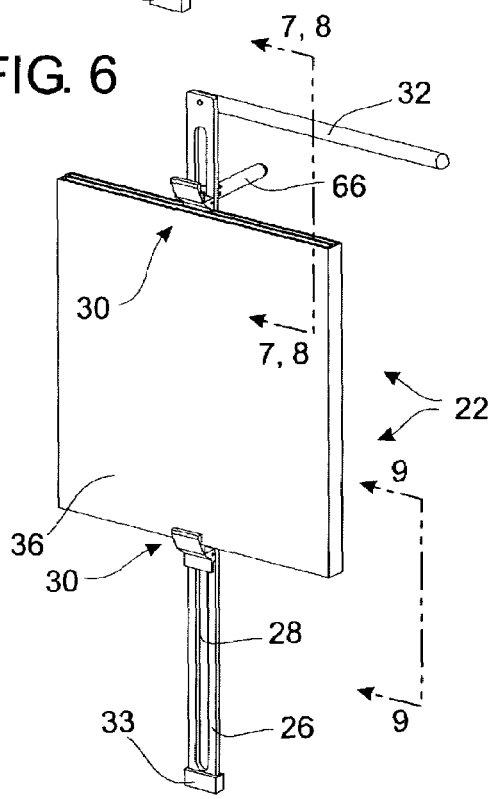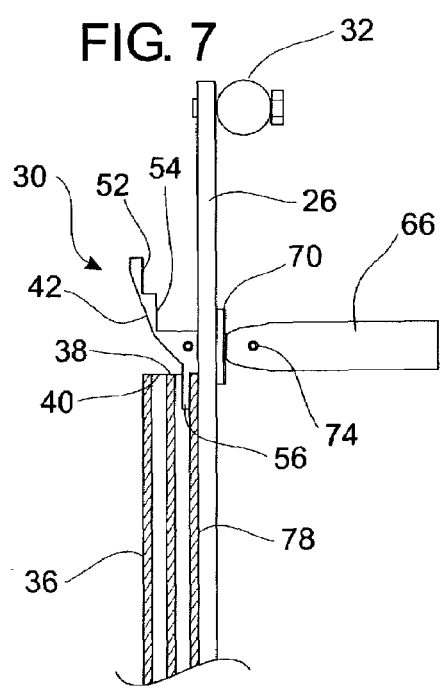

X-RAY CASSETTE HOLDER AND CLIPS

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The present invention relates to the field of x-ray technology. More specifically, it is directed towards an x-ray film cassette holder and clips for such a holder.

BACKGROUND OF THE INVENTION

Veterinarians with large animal practices typically work from their truck driving from one client's ranch to another client's ranch. This requires them to carry all of the equipment necessary to practice medicine and surgery as well as perform diagnostic procedures.

One of the pieces of this equipment is a portable x-ray machine and x-ray film cassettes. This is typically used to examine the limbs and joints of large animals, especially horses. In a purchase examination of a horse, it may be necessary to take thirty or more radiographs of the horse's lower limbs. Each joint is x-rayed from several different angles to obtain a complete picture of the condition and health of the joint. In order to take a radiograph, an x-ray cassette containing the film is held adjacent to the body part being x-rayed. The x-ray machine is then used to shoot x-rays through the body part and into the cassette and film.

There are two types of x-ray cassettes typically used. The first type of cassette is an aluminum cassette which has a thickness of approximately 9/16 of an inch and typically has an area of 8"×10", 10"×12", or 14"×17". In order to use the aluminum cassettes, the x-ray film must be loaded into the cassette while in a photographer's dark room. Use of the dark room is necessary to avoid exposing the x-ray film. Each cassette contains enough film for one x-ray. Therefore, in order to do one purchase horse examination, it would be necessary to have thirty or more aluminum cassettes loaded with film then carried into the barn for exposure.

The vinyl cassette holder or tunnel is a newer version of the x-ray cassette. The tunnel is approximately 13/16 of an inch thick and typically has an area of 8"×10". When using the tunnel, the x-ray film is loaded into the vinyl cassette in a photographer's dark room. Each vinyl cassette contains enough film for one x-ray. The vinyl cassette is an envelope shaped device which is approximately 1/8" thick, when loaded with film. The area of the vinyl cassette is approximately 8"×10". It has a lens located on either side of the film. In using the tunnel, the vinyl cassette containing the x-ray film is inserted into the tunnel. The tunnel holds the lenses against the film to produce a sharp image. The cassette is then held in place while the radiograph is taken. The vinyl cassette containing the x-ray film is then removed from the tunnel and a new cassette containing x-ray film is then inserted into the tunnel so the next x-ray can be taken.

X-ray film cassette holders are known in the art. U.S. Pat. No. 4,542,522 issued to Gilbert L. Blais on Sep. 17, 1985 discloses such a device. These prior art holders allow a veterinarian assistant to hold the x-ray film cassette steady in the appropriate spot without being in the line of fire of the x-ray machine. Thus reducing the assistant's exposure to x-rays.

The x-ray film cassette holder disclosed in the '522 patent secures two opposing corners of the cassette and holds the cassette secure against the adjacent sides of the cassette holder. In order to change cassettes, it is necessary to loosen the members securing the opposing corners of the cassette, remove the current cassette and replace it with a new cassette. Loosening the members requires partially unscrewing a threaded nut. His can become a tedious and time consuming task, especially considering that in a typical purchase examination of a horse, it would require that the cassette be changed thirty some times.

Another example of an x-ray cassette holder is the one disclosed in U.S. Patent Application Publication No. US2002/0039402A1 published on Apr. 4, 2002 disclosing an x-ray cassette holder (the '402 patent application). The '402 patent application discloses an x-ray cassette holder which secures opposing sides of the cassette using a U-shaped channel. The cassettes are changed by loosening a screw holding one of the channels in place and then sliding the channel along the bracket far enough so the cassette can be removed and then putting in a new cassette and sliding the U-shaped channel back in place and re-tightening the screw.

While the prior art may work well with the traditional aluminum cassette which requires that the entire cassette be replaced after each x-ray is shot, the prior art, however, adds unnecessary labor to x-ray taking when using the newer style tunnel cassette. With the tunnel, only the vinyl cassette holding the x-ray film is removed from the tunnel and replaced with a new cassette containing the x-ray film for the next picture. However, with the prior art cassette holders, it is necessary to remove the entire tunnel from the holder, replace the vinyl cassette and then reinstall the tunnel into the cassette holder. This adds unnecessary time, labor and expense.

Often times, the assistant tires of removing and reinserting the cassettes into the x-ray cassette holder. At that point, the assistant may begin holding the cassettes in place while wearing a pair of lead-lined gloves and a lead-lined apron to shield the assistant from the x-ray. This obviously raises concerns of the dangers of exposure to x-rays.

BRIEF SUMMARY OF THE INVENTION

Responsive to the foregoing challenges and shortcomings of the prior art, the Applicant has developed an innovative x-ray cassette holder. The Applicant has also developed an innovative clip to be used with the x-ray cassette holder. The cassette holder provides a simple, compact and durable device which allows the user to be in close contact with the horse while holding the cassette in place. This gives assurance to the animal rendering them easier to handle.

The clips are compatible for use with both the traditional styled aluminum x-ray film cassettes as well as the newer tunnel and vinyl cassettes. The clips allow for quick changing of the cassettes. When using the clips with the new tunnel, the vinyl cassette and film can be changed without removing the tunnel from the x-ray cassette holder. Further, the x-ray cassette holders and clips allow the cassette to be held at many different angles allowing access to difficult areas.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

In this respect, before explaining at least one embodiment of the invention in detail, it is to be understood that the invention is not limited in this application to the details of construction and to the arrangement so the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Further, the purpose of the foregoing abstract is to enable the U.S. patent and Trademark Office and the public generally, and especially the design engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The additional objects and advantages of the invention are set forth, in part, in the description which follows and, in part, will be apparent to one of the ordinary skill in the art from the description and/or from the practice of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings, depictions and descriptive matter in which thee is illustrated preferred embodiments and results of the invention.

DESCRIPTION OF THE DRAWINGS

FIG. 4 is perspective view of the x-ray film cassette holder and clips holding an aluminum x-ray film cassette;

FIG. 5 is a sectional view as indicated in FIG. 4 of the upper portion of the film cassette holder and a clip holding an aluminum x-ray film cassette. The motion of the grip is indicated in FIG. 5;

FIG. 6 is a perspective view of the x-ray film cassette holder and clips holding a tunnel cassette;

FIG. 7 is a sectional view as indicated in FIG. 6 of the x-ray film cassette holder and clip holding the upper portion of a tunnel cassette;

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specifications describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
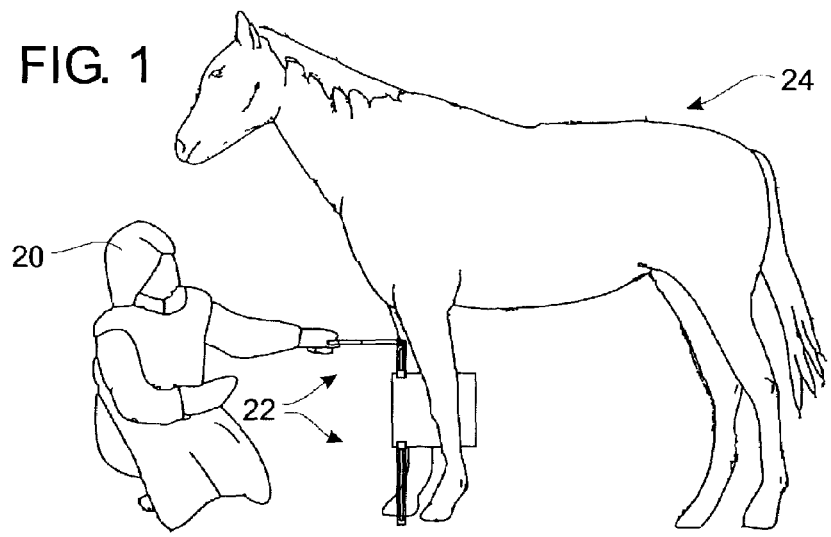
FIG. 1 is a side view of the x-ray cassette holder and clips being used for an x-ray of the front leg of a horse.

FIG. 1 shows an assistant 20 holding the x-ray cassette holder 22 in place for an x-ray of the front leg of a horse 24.

Figure 2:
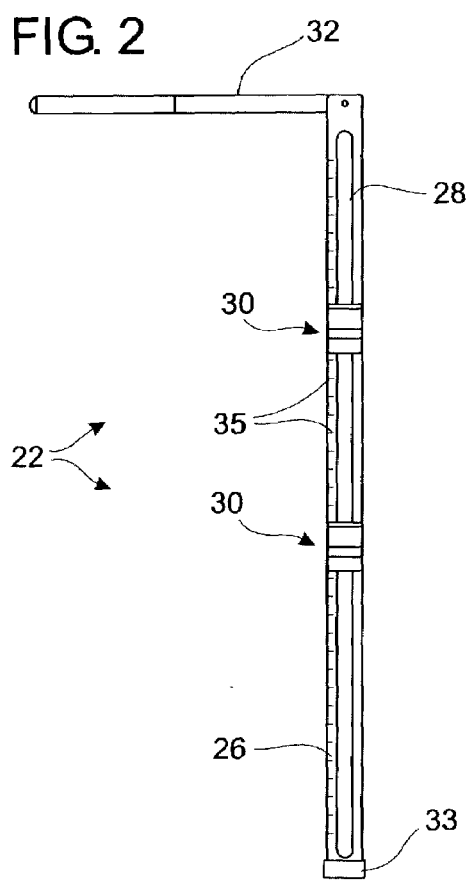
FIG. 2 is a front view of the x-ray film cassette holder and clips.
Figure 3:
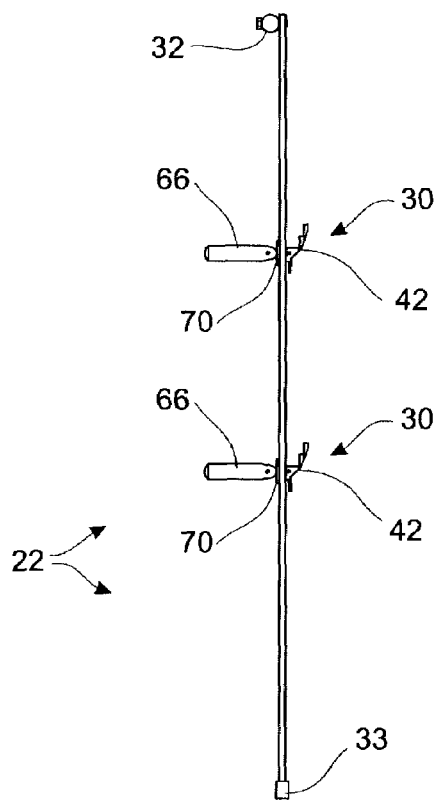
FIG. 3 is side view of the x-ray film cassette holder and clips.

FIGS. 2 and 3 show a front view and a side view, respectively, of the x-ray cassette holder 22. The x-ray cassette holder 22 has an upright structure 26. There is an elongated slot 28 contained in the upright structure 26. A pair of clips 30 engage and can be slid along the elongated slot 28. There is a handle 32 pivotally attached to the upright structure 26. A cap 33 can be placed on the lower end of the upright structure 26. The cap 33 can be made of any type of skid resistant material such as rubber or plastic and helps prevent the lower end of the upright structure 26 from sliding when used on a hard surface. Markings 35 can be placed on any of the surfaces of the upright structure along the elongated slot 28 to help consistently place the clips 30 in the same place. The markings 35 can be numbered and placed at set intervals to indicate the height of the clip 30.

In order to better understand how the clips 30 of the present invention operate, it is necessary to understand the x-ray film cassettes that are commonly used. FIG. 4 shows the x-ray cassette holder 22 in use with a typical aluminum x-ray film cassette 34. As previously mentioned, in order to install and remove x-ray film from an aluminum cassette 34, it is necessary to perform the removal and installation of the x-ray film within the confines of a photographer's dark room. Exposing x-ray film to light will ruin the image captured on the film. Therefore, once in the field, when an aluminum cassette 34 has been used once, it is necessary to remove that aluminum cassette 34 and replace it with another aluminum cassette 34 containing an unexposed piece of x-ray film.

Figure 8:
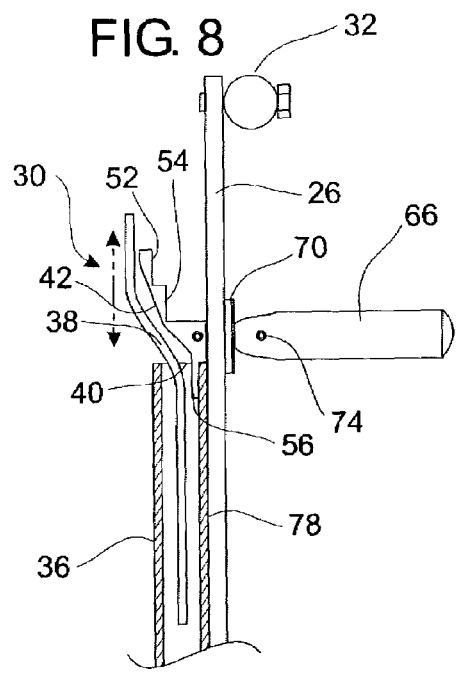
FIG. 8 is a cross-sectional view as indicated in FIG. 6 of the x-ray film cassette holder and clip holding the upper portion of a tunnel cassette while the vinyl cassette is being removed or inserted.

FIGS. 6, 7, 8 and 9 show the x-ray cassette holder 22 and clips 30 in use with a tunnel 36. As previously mentioned, the x-ray film used with a tunnel 36 is contained in an envelope-like device called a vinyl cassette 38. The x-ray film is loaded in to the vinyl cassette 38 in the confines of a photographer's dark room. The vinyl cassette 38 protects the x-ray film contained inside of it from exposure to light. Once in the field, the tunnel 36 is attached to the x-ray cassette holder 22 at the desired height using one clip 30 on the top and a second clip 30 on the bottom. The vinyl cassette 38 containing the x-ray film is then slid into the tunnel 36 through the open side 40 as shown in FIG. 8. The x-ray is then taken and the vinyl cassette 38 containing the used x-ray film is removed as shown in FIG. 8 and another vinyl cassette 38 containing new x-ray film is then inserted and the device is ready for another x-ray.

Figure 10:
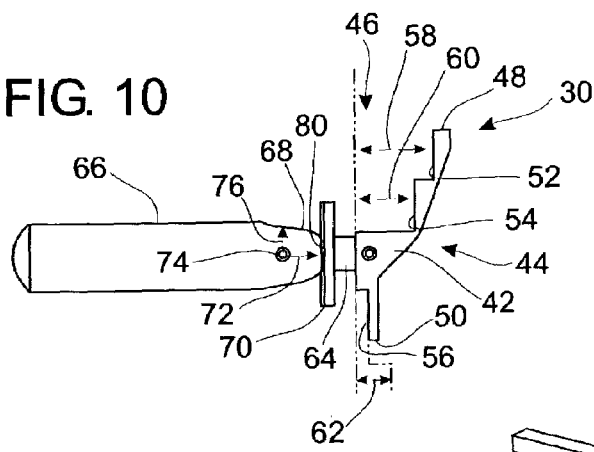
FIG. 10 is a side view of the preferred embodiment of the clip.
Figure 11:
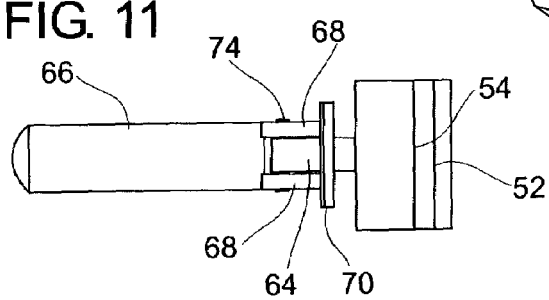
FIG. 11 is a top view of the preferred embodiment of the clip.
Figure 12:
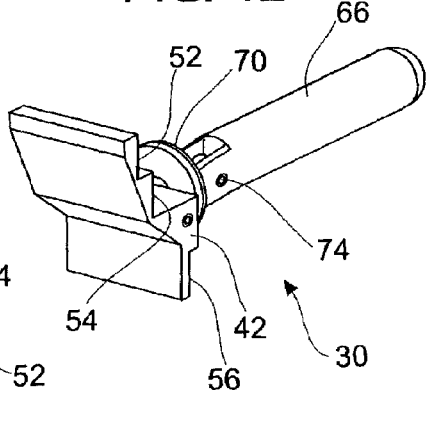
FIG. 12 is a front perspective view of the preferred embodiment of the clip.

FIG. 10 shows a side view of the preferred embodiment of the clip 30. FIG. 11 is a top view of the clip 30. The clip 30 has a body 42 with a front side 44 and a back side 46. The body 42 also has a top end 48 and a bottom end 50. The top end 48 of the back side 46 has a first shoulder 52 and a second shoulder 54. The bottom end 50 of the back side 46 has a third shoulder 56.

The first should 52 has a depth 58 as indicated in FIG. 10 of preferable approximately 0.8". The second shoulder 54 has a depth 60 as indicated in FIG. 10 of preferably approximately 0.54". The third shoulder 56 has a depth as shown in FIG. 10 of preferably approximately 0.115". These depths correspond to certain dimensions of the aluminum cassettes 34 and tunnels 36. Therefore, it is possible that the depths could vary to better fit an aluminum cassette 34, tunnel 36 or other type of cassette.

The first end of a pin 64 is coupled to the body 42. The second end of the pin 64 is coupled to a grip 66. The grip 66 as shown in the drawings is pivotally attached to the pin 64. The grip 66 has a cammed surface 68 which in the preferred embodiment bears upon one or more washers 70 contained on the pin 64.

The grip 66 is attached to the pin 64 such that the distance 72 as indicated in FIG. 10 between the cammed surface 68 and the pivot point 74 is greater than the distance 76 between the cammed surface 68 and the pivot point 74.

Referring now to FIG. 5, therefore the locking mechanism of the clip 30 is operated by moving the grip 66 between a locked or closed position where the grip 66 is parallel with the pin 64 (shown in the solid lines in FIG. 5) and an open or unlocked position where the grip 66 is perpendicular to the pin 64 (shown in dashed lines in FIG. 5). When the clip 30 is in the unlocked or open position, the clip 30 can slide along the elongated slot 28. When the clip 30 is in the closed or locked position, the clip 30 is secured to the upright structure 26.

In the preferred embodiments, the top end 48 of the front side 44 of the clip 30 has a contoured face which the vinyl cassette 38 bends around as it is inserted and removed from the tunnel 36 as shown in FIG. 8.

FIGS. 4 and 5 show the x-ray cassette holder 22 and clips 30 in use with an aluminum cassette 34. In use, the bottom clip 30 is located at the desired level. The grip 66 is then moved into the locked position to secure the bottom side of the cassette 34 to the upright structure 26. The top clip 30 is then moved to engage the top side of the aluminum cassette 34 and the grip 66 of the top clip 30 is then moved into the locked position to secure the top side of the cassette 34 to the upright structure 26. As best seen in FIG. 5, when the clip 30 is used with an aluminum cassette 34, the second shoulder 54 is used to engage the upper and lower sides of the aluminum cassette 34.

Figure 9:
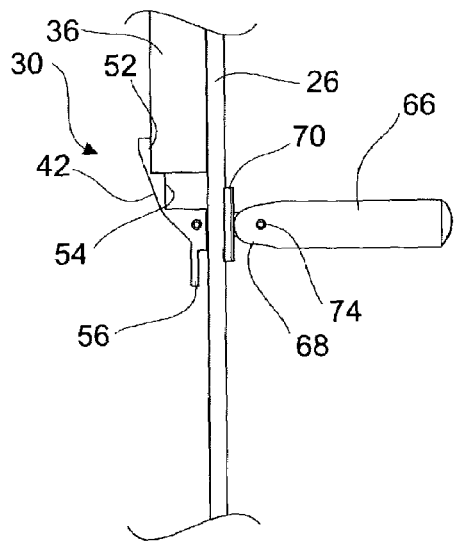
FIG. 9 shows the x-ray film cassette holder and a clip holding the lower end of a tunnel cassette.

FIGS. 6, 7, 8 and 9 show the x-ray cassette holder 22 and clips 30 of the present invention in use with a tunnel 36. In use, the bottom clip 30 is moved to the desired height on the upright structure 26. The lower clip 30 is then clamped onto the bottom edge of the tunnel 36 by moving the grip 66 from the open to the closed position. As best seen in FIG. 9, the first shoulder 52 of the clip 30 is used to secure the bottom edge of the tunnel 36. The top clip 30 is then moved into place such that the third shoulder 56 of the clip 30 engages the top edge of the back wall 78 of the tunnel 36, as best seen in FIGS. 7 and 8. The top clip 30 is then secured in place by moving the grip 66 from the opened to the closed position. A vinyl cassette 38 containing the x-ray film is slid around the contoured face of the top clip 30 and into the tunnel 36. The x-ray cassette holder 22 and loaded tunnel 36 are then held in place while the x-ray is taken. Once the x-ray has been taken, the vinyl cassette 38 is pulled through the opened side 40 of the tunnel 36 and around the contoured face of the clip 30, as shown in FIG. 8. The tunnel 36 is then reloaded in the same manner with another vinyl cassette 38 for the next x-ray.

It will be apparent to those skilled in the art that various modifications and variations can be made in the construction, configuration, and/or operation of the present invention without departing from the scope or spirit of the invention. For example, in the embodiments mentioned above, variations in the materials used to make each element of the invention may vary without departing from the scope of the invention. Thus, it is intended that the present invention cover the modifications and variations of the invention provided they come within the scope of the appended claims and their equivalents.

Figure 13:
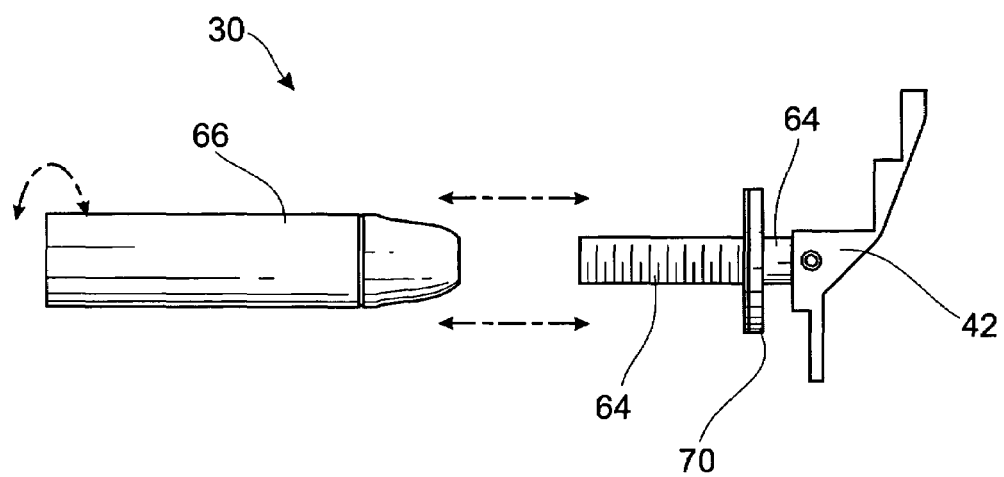
FIG. 13 is an exploded view of one embodiment of the present invention to illustrate a grip threadedly engaging the pin.

In alternative embodiments, it should be noted that the present invention could be manufactured without any washers 70. In this embodiment, the locking mechanism would be created by the cammed surface 68 engaging the back side of the upright structure 26. Another embodiment of the locking mechanism as shown in FIG. 13 might be to have a portion of the end of the pin 64 opposite the clip 30 be threaded and to have the grip 66 or a nut threadedly engage the pin 64. Here again, the locking mechanism could be used either with or without washers 70. In the threaded embodiment of the locking mechanism, the clip 30 would be locked in place by tightening the grip 66 such that it bears against either the washers 70 and the upright structure 26 or directly against the upright structure 26.

Due to the fact that the aluminum cassettes 34 and tunnel 36 are used to x-ray other types of animals including humans it would be possible that the clips 30 of the present invention as well as the x-ray cassette holder 22 and clips 30 could be used to x-ray any other type of an animal including humans.

Further, in another alternative embodiment of the present invention, the end of the grip 66 which has the cammed surface 68 can be made with a flat section 80, as best seen in FIGS. 5 and 10 to provide the user with a positive feedback when the grip 66 is moved into the locked position. The cammed surface 68 can also be made without a flat section 80 as shown in FIG. 9.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments,

What is claimed is:

1. An x-ray cassette holder clip comprising:
   a body having a front side, a backside;
   the front side having a top end and a bottom end;
   the back side having a top end and a bottom end;
   a first shoulder and a second shoulder located on the top end of the back side of the body;
   a third shoulder sized to hold a back wall of a tunnel located on the bottom end of the back side;
   a contoured face located on the top end of the front side; and
   a locking device coupled to the back side comprising
   a pin coupled to the back side of the body;
   a grip coupled to the pin; and
   the grip having a cammed surface.

2. An x-ray cassette holder clip as claimed in claim 1 further comprising a flat section on the cammed surface.

3. An x-ray cassette holder clip as claimed in claim 1 wherein the locking device comprises:
   a pin coupled to the back side of the body; and
   a grip threadedly engaging the pin.

4. An x-ray cassette holder clip comprising:
   a body having a front side, a backside;
   the front side having a top end and a bottom end;
   the back side having a top end and a bottom end;
   a first shoulder and a second shoulder located on the top end of the back side of the body;
   a third shoulder sized to hold a back wall of a tunnel located on the bottom end of the back side;
   a contoured face located on the top end of the front side; and
   a locking device coupled to the back side comprising
   a pin coupled to the back side of the body; and
   a nut threadedly engaging the pin.

5. An x-ray cassette holder clip comprising:
   a body having a front side, a back side;
   the front side having a top end and a bottom end;
   the back side having a top end and a bottom end;
   a first shoulder and a second shoulder located on the top end of the back side of the body;
   a third shoulder on the bottom end of the back side;
   a contoured face located on the top end of the front side;
   a pin coupled to the back side of the body;
   a grip pivotally coupled to the pin; and
   a cammed surface on the grip.

* * * * *